United States Patent [19]

Lunn

[11] 4,322,873
[45] Apr. 6, 1982

[54] HIND LEG SKINNER

[75] Inventor: John G. Lunn, Austin, Minn.

[73] Assignee: Geo. A. Hormel & Company, Austin, Minn.

[21] Appl. No.: 199,032

[22] Filed: Oct. 20, 1980

[51] Int. Cl.³ .............................................. A22B 5/16
[52] U.S. Cl. ............................................. 17/21; 99/587
[58] Field of Search .................. 17/21, 50, 62; 99/587

[56] References Cited

U.S. PATENT DOCUMENTS

| | | | |
|---|---|---|---|
| 2,897,537 | 8/1959 | Schmidt, Jr. | 17/21 |
| 3,046,597 | 7/1962 | Macy et al. | 17/21 |
| 3,220,051 | 11/1965 | Fill | 17/21 |

Primary Examiner—Willie G. Abercrombie

Attorney, Agent, or Firm—Williamson, Bains, Moore & Hansen

[57] ABSTRACT

Apparatus for pulling the skin from the hind legs of hog carcasses comprises a hand held power operated clamping device for gripping the skin of the hind leg of the carcass. A power operated retracting mechanism includes a pneumatic power unit connected to the clamping device by cable and the retracting mechanism is operable when retracted to pull the clamped skin from the hind leg. A control mechanism controls operation of the clamping device for selective cycling of the latter between clamping and released conditions, and automatically cycles the pneumatic retracting unit through the retracting and extension cycles.

1 Claim, 9 Drawing Figures

HIND LEG SKINNER

SUMMARY OF THE INVENTION

This invention relates to a stripper apparatus and more particularly to an apparatus for pulling the skin from the hind legs of hog carcasses.

It is an object of this invention to provide a novel apparatus for pulling the skin from the hind legs of hog carcasses including a hand-type clamping device which grips the skin of the animal carcass and retracting means for pulling the clamping device and the skin gripped thereby to strip the skin from the hind leg of the hog carcass.

Another object of this invention is to provide a skin stripper apparatus including a hand-type power operated clamping device connected to a retracting device and including means on the clamping device for simultaneously actuating the clamping and retracting devices to permit the skin to be readily stripped from the hind leg of a hog carcass.

These and other objects and advantages of the invention will become readily apparent as the following description is read in conjunction with the accompanying drawings wherein like reference numerals are used to refer to the views.

FIGURES OF THE DRAWINGS

Figure 7:
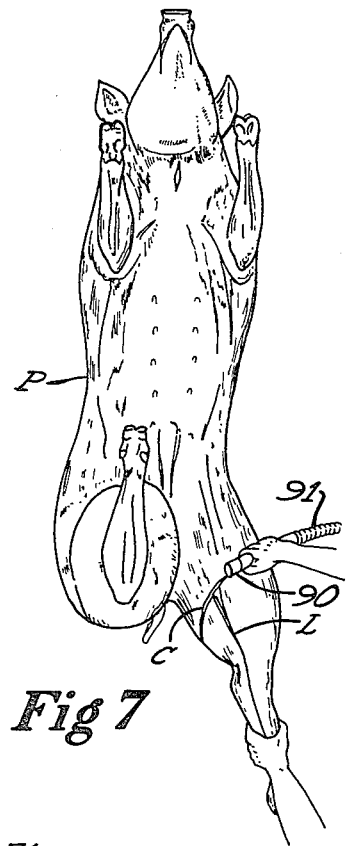
Figure 8:
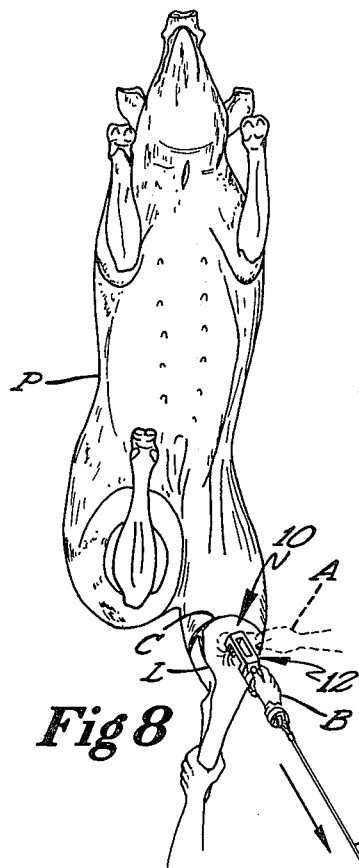
Figure 9:
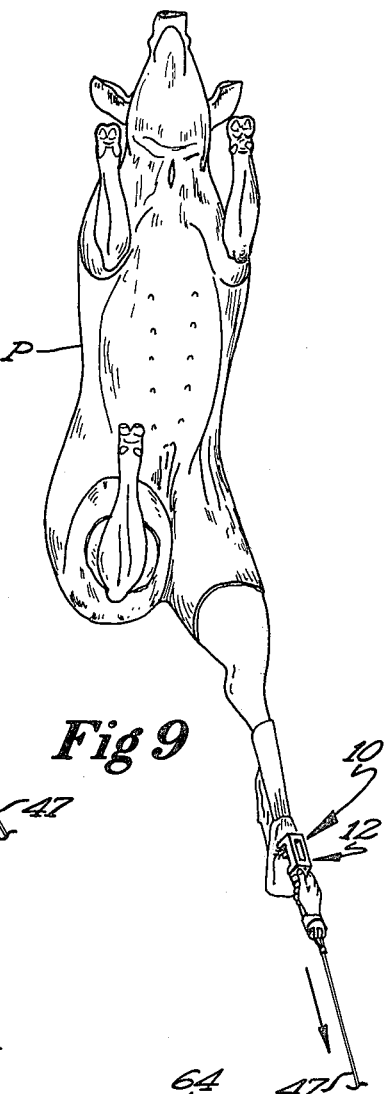

FIGS. 7, 8, and 9, are diagrammatic views illustrating the steps involved in removing the skin from the hind legs of a hog carcass.

DESCRIPTION OF THE PREFERRED EMBODIMENT OF THE INVENTION

Figure 1:
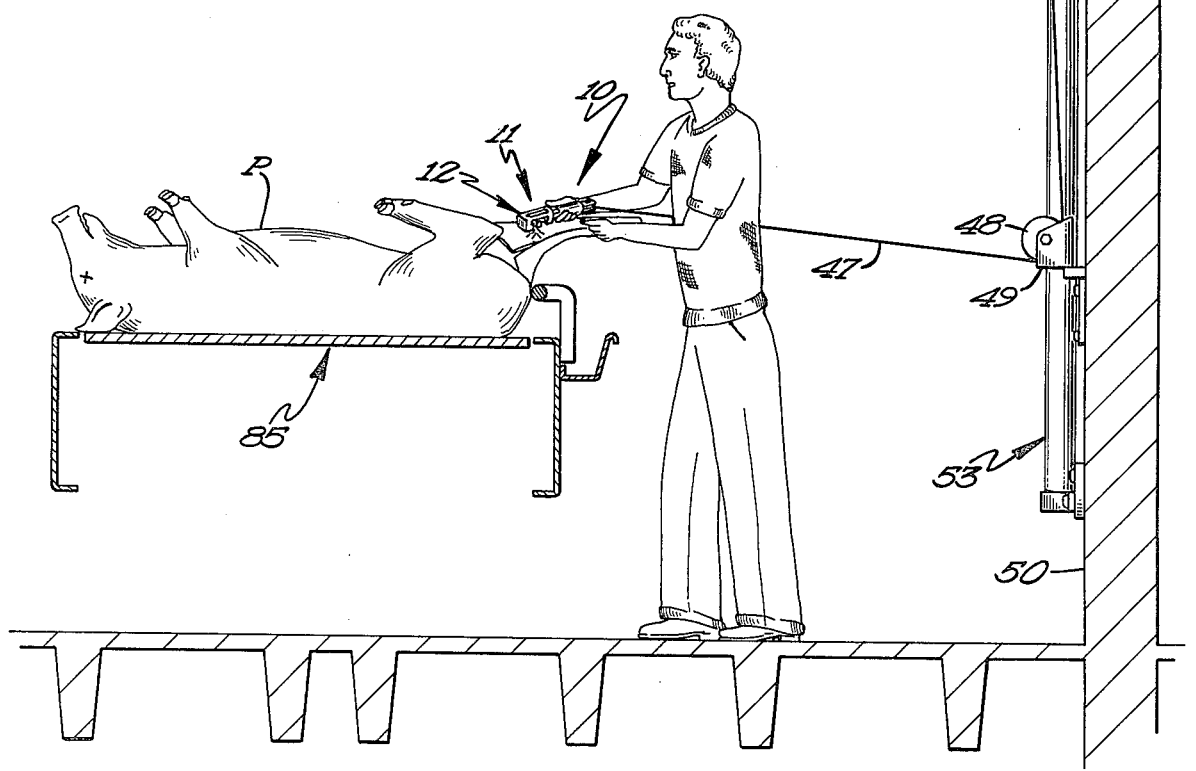
FIG. 1 is a diagrammatic side elevational view of the apparatus.

Referring now to FIG. 1, it will be seen that one embodiment of the novel stripper apparatus, designated generally by the reference numeral 10, is thereshown.

Figure 2:
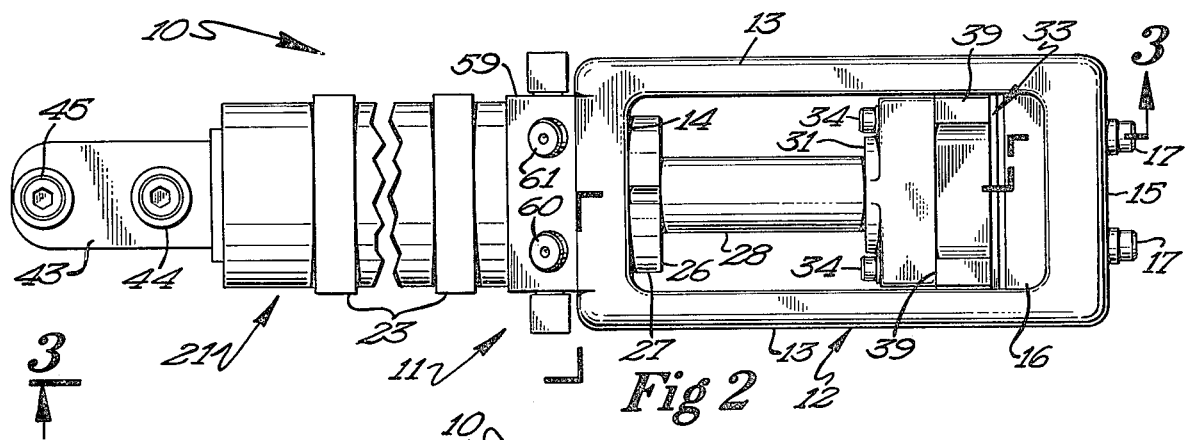
FIG. 2 is a top plan view of the clamping device.

The stripper apparatus 10 includes a clamping device 11 comprised of a support frame 12 which is of generally rectangular shaped configuration when viewed from above, as best seen in FIG. 2. The support frame 12 includes a pair of laterally spaced apart longitudinal frame elements 13 which are integral with an inner transverse frame element 14 and an outer transverse frame element 15. A fixed jaw 16 is rigidly secured to the outer transverse frame element 15 by means of bolts 17 that project through bores 18 in the outer transverse frame element and threadingly engage threaded recesses 19 in the fixed jaw 16. It will be noted from FIG. 3 that the clamping face of the fixed jaw 16 is provided with a plurality of transverse horizontally disposed ribs 20.

Figure 3:
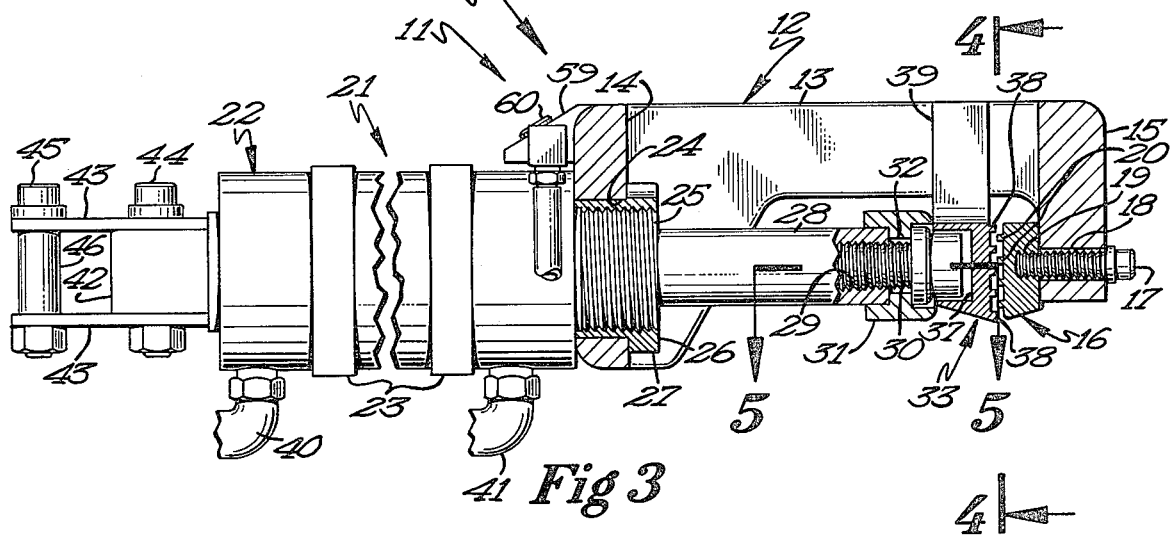
FIG. 3 is a cross-sectional view taken along line 3—3 of FIG. 2 and looking in the direction of the arrows.
Figure 4:
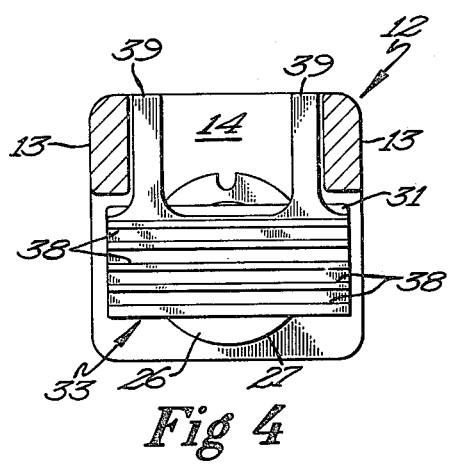
FIG. 4 is a vertical sectional view taken approximately along line 4—4 of FIG. 3 and looking in the direction of the arrows.

The clamping device 11 also includes a first fluid pressure cylinder and piston unit 21 which comprises a cylinder 22 having longitudinally spaced apart rectangular collars 23 affixed thereto and projecting outwardly therefrom. The inner transverse frame element 14 of the support frame 12 is provided with an opening 24 therethrough as best seen in FIG. 3. The cylinder 22 is provided with a reduced threaded end 25 which threadedly engages an internally threaded sleeve 26 having a flange 27 extending radially outwardly therefrom. It will be seen that the inner transverse frame element 14 is clamped between the flange 27 and the end of the cylinder 22 to rigidly secure the cylinder 22 to the support frame.

The cylinder 22 is a double acting hydraulic cylinder and is provided with a piston (not shown) which is movable therein. The piston is connected to piston rod 28 which projects outwardly through the reduced threaded end 25 of the cylinder. The piston rod 28 has an axially extending outwardly opening threaded recess 29 therein for accommodating a bolt 30. A generally rectangular shaped mounting block having an opening 32 therethrough is clamped by bolt 30 against the end of the piston rod 28, as best seen in FIG. 3.

Figure 5:
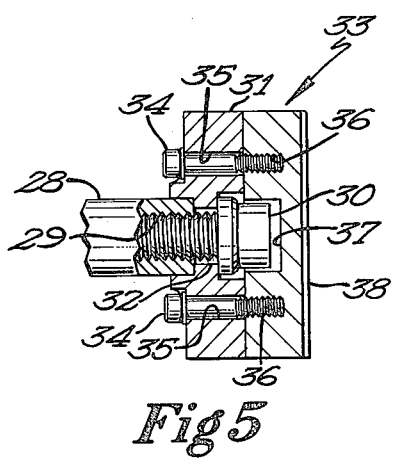
FIG. 5 is a cross-sectional view taken approximately along line 5—5 of FIG. 3 and looking in the direction of the arrows.

Referring now to FIG. 5, it will be seen that a movable jaw 33 is secured to the mounting block 31 by means of bolts 34. In this regard, the mounting block 31 is provided with a pair of spaced apart openings 35 therethrough which are disposed in registering relation with threaded recesses or taps 36 in the movable jaw 33. The bolts 34 project through the openings 35 in the mounting block 31 and threadingly engage the threaded recesses 36 of the movable jaw 33. It will further be noted that the movable jaw 33 is provided with a central recess 37 therein for accommodating the head of the bolts 30 therein. The clamping face of the movable jaw 33 is also provided with vertically spaced apart transverse ribs 38 which are arranged in interdigitating relation with the ribs on the fixed jaw, as best seen in FIG. 3.

The movable jaw 33 is also provided with upstanding laterally spaced apart guide elements 39 positioned between the longitudinal frame elements 13 and serving to prevent lateral displacement of the piston rod and movable jaw during extension and retraction thereof. A pair of elongated conduits 40 and 41 each has one end thereof connected in communicating relation to one end portion of the cylinder 22 and each has its other end connected to a source of hydraulic liquid under pressure. It will therefore be seen that when fluid is supplied to the cylinder through the conduit 40 or the conduit 41, piston rod 28 will be selectively extended or retracted.

It will be noted that the cylinder 22 is provided with an attachment element 42 fixed to the closed end thereof and a pair of substantially flat generally rectangular plates 43 are positioned on opposite sides of the attachment element. A nut and bolt assembly 44 clamps the plates 43 to opposite surfaces of the attachment element 42. A second bolt and nut assembly 45 are secured to the plates 43 and serve to secure a spacer 46 therebetween.

One end of an elongated cable is secured to the spacer 46 and the cable is thereafter trained about a pulley 48 which is secured to a vertical wall 50 by means of a bracket 49. The cable 47 is then extended upwardly and is trained about a second pulley 51 which is mounted on the wall 50 by means of a bracket 52. The end of the cable 47 is secured to a second fluid pressure and piston unit 53. The unit 53 includes a pneumatic cylinder having a piston therein to which is secured a piston rod 54.

The outer end of the piston rod 54 is provided with an attachment element 55 connected to the end of the cable 47. It will be seen that when piston rod 54 is retracted, cable 47 will be pulled in a rearward direction so that the skin held by the clamping device 11 will be pulled from the rear leg of the hog carcass. It will be seen that conduits 56 and 57 are connected in communicating relation to opposite end portions of the pneumtic cylinder and piston unit 53 and are also connected to a source of air under pressure for extending and retracting the piston rod 54.

Figure 6:
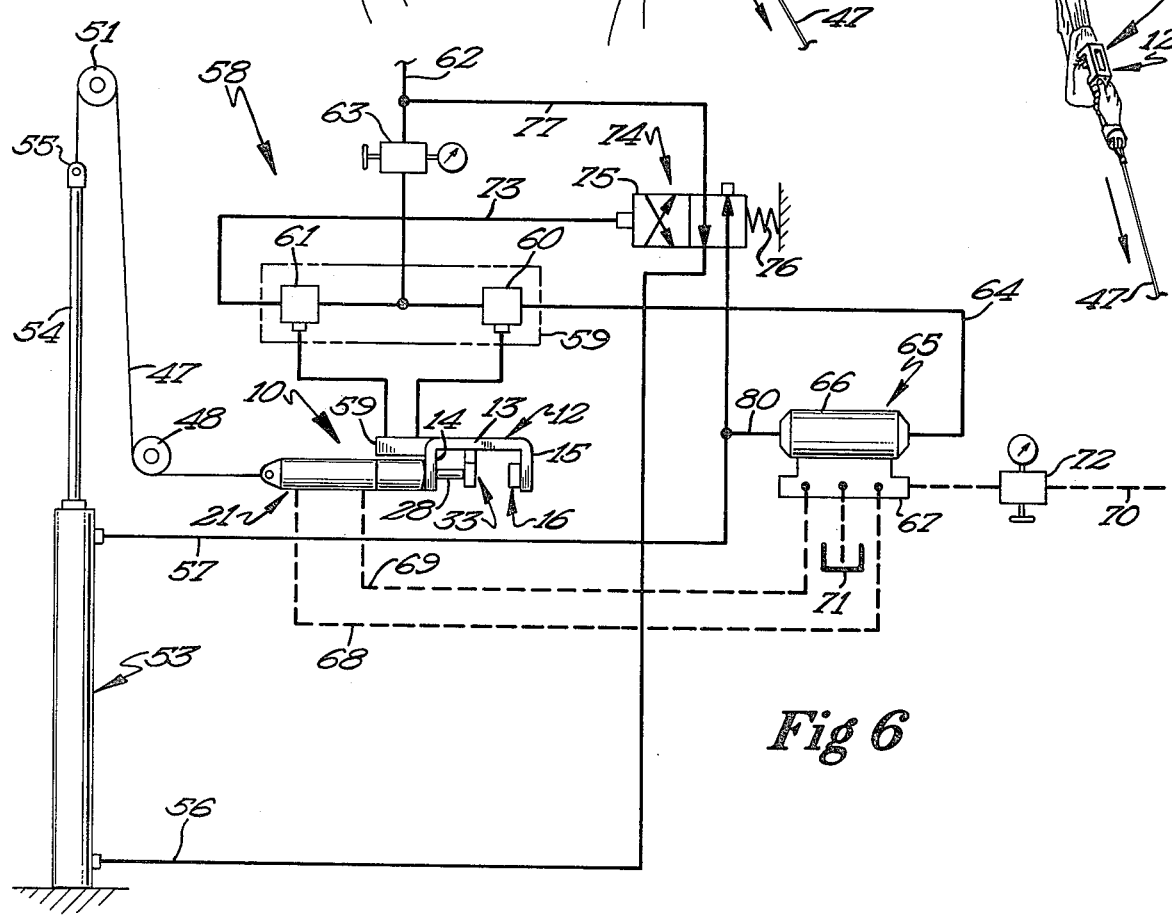
FIG. 6 is a flow diagram illustrating the pneumatic and hydraulic circuits of the apparatus.

Referring again to FIG. 6, it will be seen that the apparatus is controlled by a pneumatically operated control mechanism 58 which includes the housing 59 having control openings 60 and 61 therein. The housing 59 is mounted on the inner transverse frame element 14 of the support frame 12, as best seen in FIGS. 2 and 3. An air supply line 62 is connected to a source of air under pressure and is also connected in communicating relation to the housing 59. A suitable regulator 63 is disposed in flow controlling relation with respect to the supply line 62.

The chamber defining the control openings 60 is connected by conduit 64 to an air actuated hydraulic controller 65. The hydraulic controller 65 includes an air control member 66 which operates a hydraulic valve 67. The valve 67 is connected by conduits 68 and 69 to the hydraulic cylinder 22. The valve 67 is also connected in flow controlling relation with respect to a supply conduit 70 which is connected to a source of hydraulic fluid under pressure. A suitable regulator 72 is interposed in the supply line 70. It will also be noted that the control valve 67 is connected to a reservoir 71 which accumulates hydraulic fluid during extension and retraction of the piston rod 28 for the hydraulic cylinder 22.

The chamber defined by the control opening 61 is connected by conduit 73 to a valve 74. The valve 74 is a two-position, spring return, four-way valve which includes a spool 75 normally urged to one position by spring 76 and which is shiftable in the other direction against the bias of the spring 76 in response to a user closing the control opening 61. It will be seen that the conduit 56, which is connected in a communicating relation to one end portion of the cylinder 53, is normally intercommunicated by the spool 75 through a conduit 77 to the supply conduit 62. The other conduit 57 for the cylinder 53 is normally vented to the exterior when the spool 75 is urged by the spring 76 to its unpressurized condition. However, it will be seen that when the control opening 61 is closed, the spool 75 will be axially shifted against the bias of the spring 76 to thereby close the conduit 57 with respect to the exterior and to also close communication of the conduit 77 with respect to conduit 56. A small supply conduit 80 interconnects the conduit 57 with the air controller 66 and with the conduit 64.

In operation, the hog carcasses P will be positioned upon a conveyor 85 and moved thereby. Referring now to FIGS. 1 and 7 through 9, the operator will first make a longitudinal slit L in the skin covering the hind leg of the animal with a knife 90 provided with a vacuum hose 91. With this arrangement, any hair or debris will be evacuated through the vacuum line 91 during the cutting operation. The operator will then make a circular cut "C" in the skin of the hind leg of the carcass at the upper end of the hind leg and at the upper end of the longitudinal slot "L".

The next operator will place the clamping device adjacent the circular cut "C" so that the movable and fixed jaws thereof are in a position to clamp that portion of the skin of the hind leg. The piston rod 28 for the hydraulic unit 21 will be in the retracted position and the operator will place his thumb over the control opening 61. When this occurs, the spool 75 of the spool valve 74 will be shifted axially against the bias of the spring 76 so that the spool valve will close the conduit 57 with respect to the exterior and close communications between the supply conduit 77 and the conduit 56. The air actuated hydraulic controller 65 will be operated so that the air control member actuates the hydraulic valve 67 to supply hydraulic fluid through the conduit 68 to the cylinder 22 to extend the piston rod 28 and move the movable jaw 33 into clamping relation with respect to the fixed jaw 16 thereby clamping a portion of the skin of the hind leg of the animal carcass. Hydraulic fluid will be evacuated from the cylinder 21 through the conduit 69 to the reservoir or accumulator 71. Air under pressure will be supplied through the supply conduit 62, conduit 64, branch conduit 80 and conduit 57 to the pneumatic cylinder 53 and to cause the piston rod 54 to be retracted and to thereby retract or pull the clamping device 11 from the position shown in FIG. 8 in the direction of the arrows illustrated in FIG. 9. The skin from the hind leg of the animal carcass will be pulled or stripped from the carcass by this action.

Thereafter, when the operator removes his thumb from obstructing the opening 61, the spool valve 75 will be urged to its normal position by the spring 76, thereby intercommunicating line 57 with the exterior so that air in the pneumatic cylinder will bleed therefrom. Further, when the spool valve 75 is urged to its normal position, air will be supplied through the supply conduit 62 into the conduit 77 and through the conduit 56 to extend the pneumatic piston rod 54. When the operator thereafter places his thumb over the control opening 60, air will be supplied to the air actuated hydraulic controller 65 to operate the air control member which in turn actuates the hydraulic valve 67. Hydraulic fluid under pressure is then supplied through the conduit 69 to retract the piston rod 28 while the hydraulic fluid is returned through the conduit 68 to the reservoir 71. It will be seen that the pneumatic cylinder and piston unit is actuated through its retraction cycle by covering or closing the opening 61 but is automatically actuated to its extension cycle when the opening 61 is uncovered. On the other hand, extension and retraction of the hydraulic unit 21 requires the operator to selectively close the control openings 60 and 61.

The skin clamping and pulling apparatus is highly effective in pulling and removing the skin from the hind leg of hog carcasses without unduly taxing the operator. The removal of the skin from the hind leg is not only effective but may be accomplished quickly with a minimum of effort.

It will therefore be seen that we have provided a novel skin clamping and pulling apparatus which is not only of simple and inexpensive construction, but an apparatus which functions in a more efficient manner than any heretofore known comparable apparatus.

While the preferred embodiments of the present invention have been described, it should be understood that various changes, adaptations and modifications may be made therein without departing from the spirit of the invention and the scope of the appended claims.

What is claimed is:

1. Apparatus for pulling skin from the hind legs of hog carcasses, comprising:
   a clamping device including a support frame;
   a fixed jaw on said support frame;
   a first fluid pressure unit including a cylinder connected to a source of fluid under pressure, a piston rod movable in said cylinder between retracted and extended positions;
   a movable jaw secured to the end of said piston rod and being movable therewith, said movable jaw being spaced from said fixed jaw when the piston rod is in the retracted position, and being disposed in close proximal clamping relation with the fixed jaw when the piston rod is in the retracted position, and being disposed in close proximal clamping relation with the fixed jaw when the piston rod is in the extended position;
   a second fluid pressure including a cylinder and a piston rod movable in said cylinder between retracted and extended positions;
   an elongate, flexible member interconnected with said clamping device and the piston rod of said second fluid pressure unit whereby when the piston rod of the second unit is retracted, said clamping device will be retracted; and
   A control mechanism arranged in controlling relation with respect to said fluid pressure units, said control mechanism including actuating means on said clamping device selectively operable between clamping and released conditions, said actuating means when in the clamping condition causing said further first fluid pressure unit to move the movable jaw into clamping relation with said fixed jaw to clamp the skin of the hind leg of an animal carcass therebetween, and simultaneously causing said second fluid pressure unit to retract and pull said clamping device and the skin clamped thereby, said control mechanism being operable to cause the piston rod of said second fluid pressure unit to automatically extend after completion of the retraction stroke, said actuating means when in the released condition causing the piston rod of said first fluid pressure unit to retract to release the clamped portion of the skin clamped thereby.

* * * * *